United States Patent
Wong et al.

(10) Patent No.: US 8,713,606 B2
(45) Date of Patent: Apr. 29, 2014

(54) SYSTEMS AND METHODS FOR GENERATING A USER PROFILE BASED CUSTOMIZED MEDIA GUIDE WITH USER-GENERATED CONTENT AND NON-USER-GENERATED CONTENT

(75) Inventors: Ka Chun Wong, Hong Kong (CN); Walter R. Klappert, Los Angeles, CA (US); Michael R. Nichols, La Canada-Flintridge, CA (US); Brian Riegel, Golden, CO (US); Michael Papish, Randolph Center, VT (US); Adam Powers, Dublin, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/470,739

(22) Filed: May 14, 2012

(65) Prior Publication Data

US 2013/0305287 A1    Nov. 14, 2013

(51) Int. Cl.
*G06F 3/00* (2006.01)
*H04N 5/445* (2011.01)
*H04N 7/173* (2011.01)
*G06Q 30/00* (2012.01)

(52) U.S. Cl.
USPC ............. 725/45; 725/32; 725/40; 725/42; 725/46; 725/48; 725/51; 725/59; 725/61; 725/86; 725/87; 725/97; 725/105; 725/107; 725/109; 725/110; 348/563; 348/564; 705/14.4; 705/14.49; 705/14.53; 705/14.66

(58) Field of Classification Search
USPC ........... 725/45, 32, 40, 42, 46, 48, 51, 59, 61, 725/86, 87, 97, 105, 107, 109, 110; 348/563, 564; 705/14.4, 14.49, 14.53, 705/14.66
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2007/0156589 A1* | 7/2007 | Zimler et al. | 705/51 |
| 2007/0299976 A1 | 12/2007 | Zafar et al. | |
| 2009/0133050 A1* | 5/2009 | Kelly | 725/28 |
| 2009/0133059 A1* | 5/2009 | Gibbs et al. | 725/34 |
| 2009/0144768 A1 | 6/2009 | Nagaraja | |
| 2009/0210909 A1 | 8/2009 | Mukerji et al. | |
| 2010/0146042 A1 | 6/2010 | Kruhoeffer et al. | |

(Continued)

*Primary Examiner* — Hoang-Vu A Nguyen-Ba
(74) *Attorney, Agent, or Firm* — Ropes & Gray LLP

(57) ABSTRACT

Systems and methods for presenting user-generated content in an easily accessible manner using an interactive media guide are provided. In particular, a user may be able to peruse user-generated content through an interactive media guide which is also used to access non-user-generated media content such as linear programming (e.g., over-the-air broadcast, cable, and satellite scheduled programming) and on-demand media. The interactive media guide may include a provider of user-generated content populated with user-generated content according to the user's interests or most recently added to the provider.

22 Claims, 9 Drawing Sheets

(56) References Cited

U.S. PATENT DOCUMENTS

| | | |
|---|---|---|
| 2010/0153885 A1 | 6/2010 | Yates |
| 2011/0113454 A1 | 5/2011 | Newell et al. |
| 2011/0119707 A1* | 5/2011 | Bae et al. .................. 725/39 |
| 2011/0173663 A1 | 7/2011 | Boudalier |
| 2011/0239253 A1* | 9/2011 | West et al. .................. 725/46 |
| 2012/0023204 A1* | 1/2012 | Takemura .................. 709/219 |
| 2012/0303491 A1* | 11/2012 | Hill et al. .................. 705/27.2 |
| 2013/0031216 A1* | 1/2013 | Willis et al. .................. 709/219 |

* cited by examiner

| Date Added — 630 | Title — 640 | Clip — 650 |
|---|---|---|
| Today | Kitty Wars |  660 |
| Today | Volcanoes |  |
| 3/6/12 | Awesome Hike |  |
| 3/2/12 | London |  |

2 FOX — 610 | 3 ABC | 4 CUSTOM MEDIA SOURCE — 620 | NBC

600

| Date Added 720 | Title 740 | Clip 760 |
|---|---|---|
| Today | Kitty Wars |  |
| Today | Volcanoes |  |
| 3/6/12 | Awesome Hike |  |
| 3/2/12 | London |  |

710 — 4 Custom Media Source 770, 750, 730, 702, 700

SYSTEMS AND METHODS FOR GENERATING A USER PROFILE BASED CUSTOMIZED MEDIA GUIDE WITH USER-GENERATED CONTENT AND NON-USER-GENERATED CONTENT

BACKGROUND

Mobile devices and the Internet have proliferated society. Many mobile devices allow users to generate their own content and share generated content with their friends, family members, and the public at large. For example, users can write blogs, post to social media sites, create videos, or generate any other media content to share publicly. However, the manner in which users are presented with such shared user-generated media content or the manner in which users may access shared user-generated media content does not take user preferences into account. For example, some existing media guides present user-generated content alongside over-the-air broadcast program listings. However, the user-generated content displayed in the media guide is not tailored to the match the user's interests.

SUMMARY OF THE INVENTION

In view of the foregoing, systems and methods for presenting user-generated content using an interactive media guide are provided. In particular, a user may be able to peruse user-generated content through an interactive media guide which is also used to access non-user-generated media content such as linear programming (e.g., over-the-air broadcast, cable, and satellite scheduled programming) and on-demand media.

In some embodiments, the interactive media guide may enable a user to access user-generated content together with non-user-generated media content. User-generated content may be displayed adjacent to non-user-generated media content such that the user has a seamless interactive media guide experience. The user-generated content may have been uploaded by various users to a provider of user-generated content. The provider may not be associated with a particular user. For example, the provider may be a social networking or video sharing website. User-generated content may be retrieved from the provider using an Internet link. User-generated content may be retrieved over the Internet link by an interactive media guidance application.

In some embodiments, the user-generated content made accessible to the user may be tailored to match the user's interests as indicated by the user's profile. For example, if the user is interested in soccer and politics, the interactive media guide may display user-generated content relevant to soccer games, clips, interviews, tricks, highlights, etc. or news events, geopolitical events, interviews of politicians, etc.

In some embodiments, the user-generated content made accessible to the user may be displayed according to the date/time the user-generated content was added to the provider. For example, the interactive media guide may display user-generated content that was most recently added to the provider.

In some embodiments, the user-generated content made accessible to the user may be tailored according to the time of the day or day of the week. For example, during prime hours in morning and evening, the interactive media guide may make more user-generated content related to current events, politics, or news accessible to the user. During late mornings, mid-afternoons, or late nights, the interactive media guide may make more user-generated content related to shopping, talk shows, or kids' shows accessible to the user. During the weekends, the interactive media guide may make more user-generated content related to cartoons, sports, music, or movies accessible to the user.

In some embodiments, the interactive media guide may display a notification to the user when new user-generated content is added to the provider. In this manner, the user may be instantly made aware of recently uploaded user-generated content.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
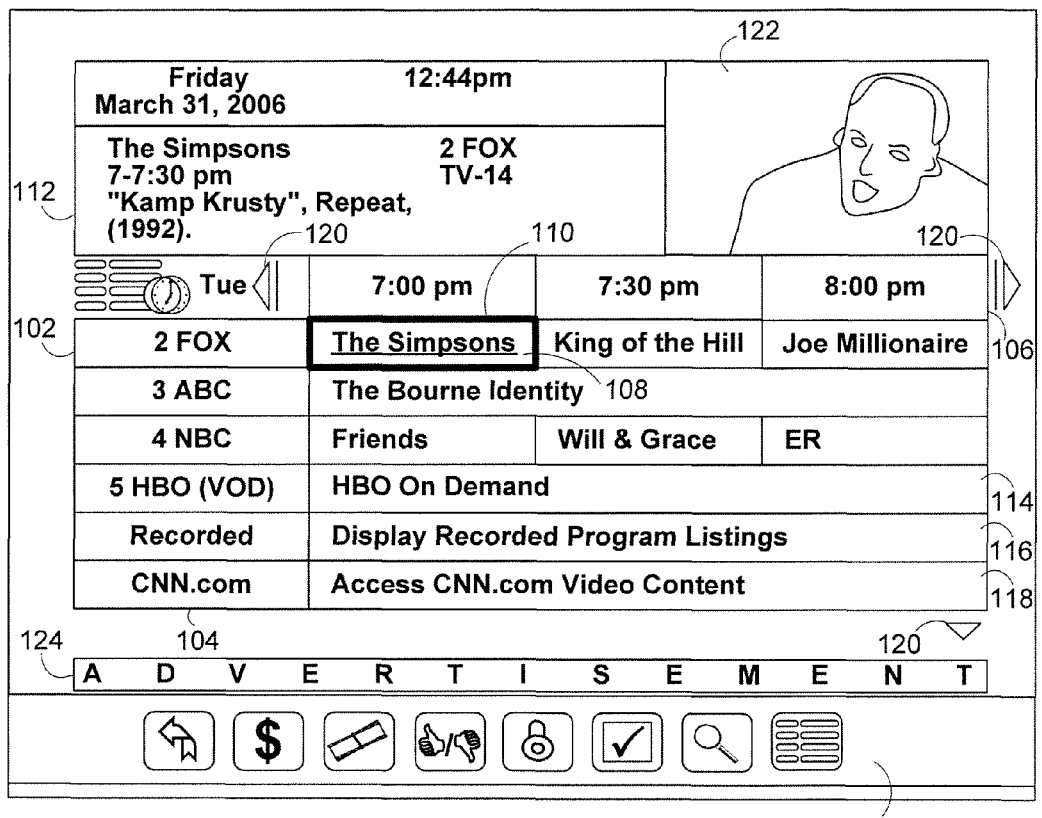
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-ondemand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
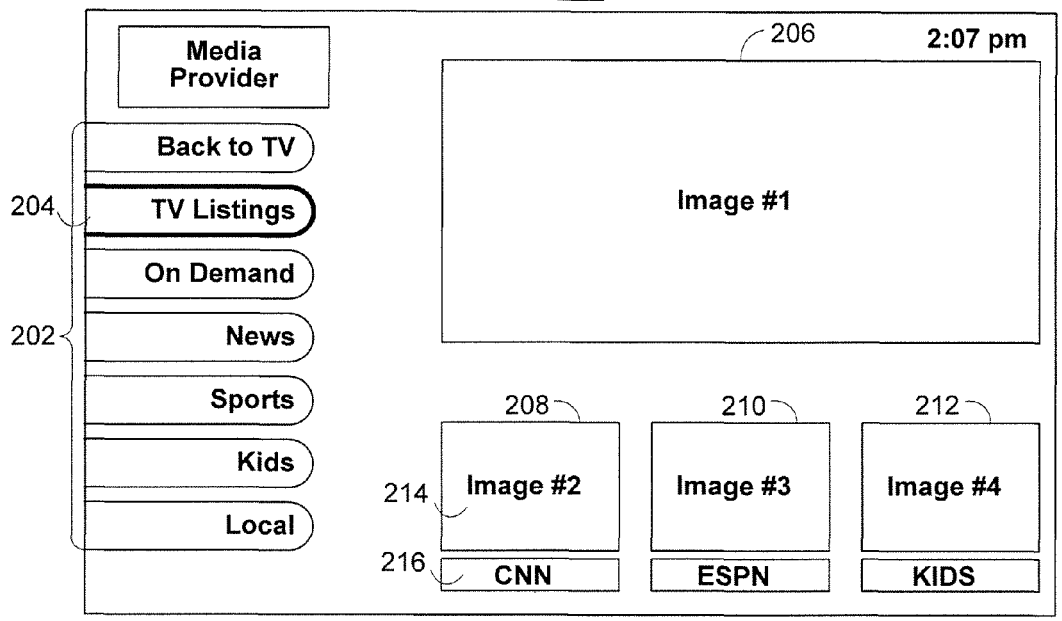

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV, only 3D programming, only user-generated content, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4.

Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
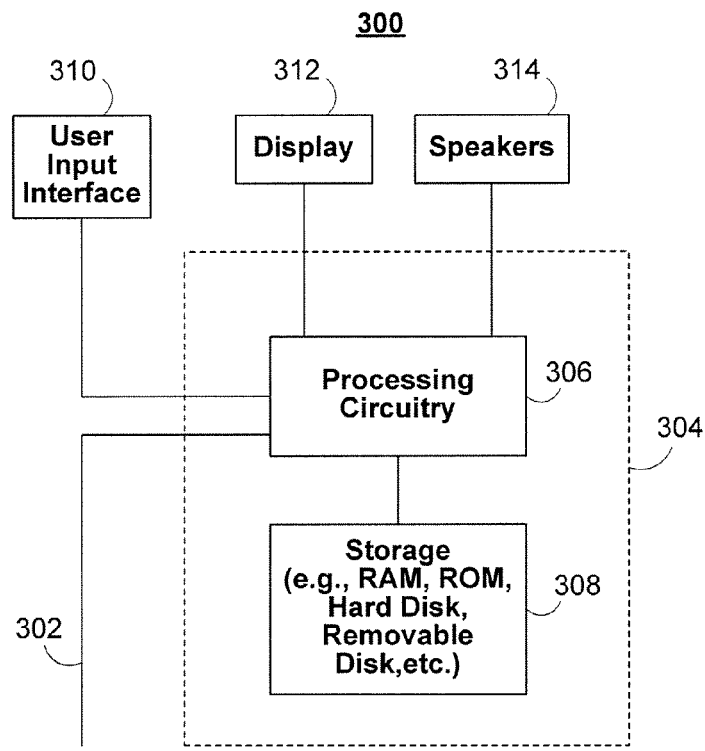
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry 304 may be configured to generate and display an interactive media guide that allows a user to conveniently access user-generated content along with conventional content sources (e.g., broadcast or cable channels). Control circuitry 304 may be configured to retrieve user-generated content from a media source to which users upload user-generated content. In some embodiments, the media source may push recently uploaded user-generated content to control circuitry 304.

Control circuitry 304 may be configured to display a custom media source adjacent to conventional content sources on the interactive media guide. For example, control circuitry 304 may list a custom media source on the interactive guide in manner similar to how a broadcast channel may be listed on the interactive media guide. Control circuitry 304 may populate the custom media source with user-generated content retrieved from the media source based on user preferences. For example, user preferences may indicate the user prefers to view user-generated content that was uploaded to the media source most recently. Accordingly, control circuitry 304 may populate the custom media source with retrieved user-generated content that was uploaded to the media source most recently. For example, user preferences may indicate the user prefers to view user-generated content that matches the user's interests. Accordingly, control circuitry 304 may populate the custom media source with retrieved user-generated content from the media source that matches the user's interests.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

License files including information about the identity of the user and/or user equipment device 300 and media content access right and permission information may be stored on storage 308. The user or user equipment device 300 may be identified by a unique number. Media content authorization information may describe access rights to media content and permission information. Access rights may describe conditions of access to one or more media content. For example, authorization may be in terms of subscription to a grouping of media content that are provided by a media content service provider for a period of time, and may depend on the terms of a service agreement between a user and the copyright owner or distributor. For example, a user may be subscribed to access the entire television series of Battlestar Galactica or the user may be subscribed to a sports broadcast package that grants access to a number of pay-per-view shows or a number of sports channels. For example, authorization may be in terms of authorization to view user-generated content provided by the user who uploaded the user-generated content to the media source.

License files may also include decryption keys for encrypted content. For example, encrypted music, video, or other content may be stored in storage 308 and a corresponding license file may be required to unlock the content and peruse it. It may not be possible to unlock the content without having possession of the corresponding license file. License files may also store a user's website-credentials. For example, the user's authentication information for a website like Hulu or Youtube may be encrypted and stored in storage 308. Control circuitry 304 may need to access the corresponding license file in order to decrypt the website-credentials stored in storage 308. Accordingly, in order to peruse the content or access the relevant website, on a device other than user equipment device 300, it may be necessary to transfer the license file in tandem with the desired content and website-credentials. In some implementations, the license file may be stored on a server under the ownership of the copyright owner or distributor. In such instances, control circuitry 304 may retrieve the license file from the server when required.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
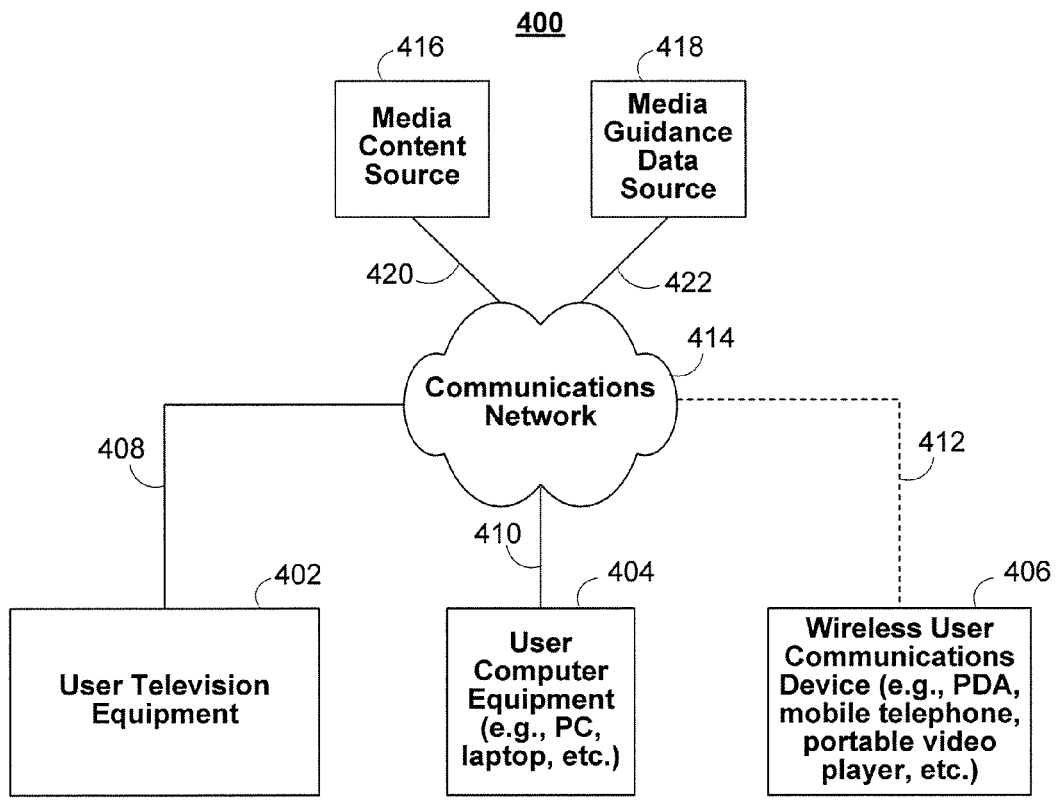
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), user-generated content sources, intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

For illustrative purposes, the present invention is described in the context of an interactive media guide that enables a user to access user-generated content conveniently from the interactive media guide. In an illustrative embodiment, the user-generated content displayed by the interactive media guide may be customized according to the user's preferences.

In some implementations, users may generate media content and upload the generated media content to a media source. Such media content generated by a user may be referred to as user-generated content. User-generated content may include Internet content (e.g., streaming content, downloadable content, Webcasts, etc.), video clips, video on demand content, audio, content information, pictures, rotating images, documents, playlists, websites, articles, books, electronic books, blogs, advertisements, chat sessions, social media, applications, games, and/or any other media or multimedia and/or combination of the same. For example, a user may record a video or an audio clip using a personal mobile device such as a cell-phone. For example, a user may record a video clip of an interesting event happening around town.

As discussed previously, a user may use various content capture devices, such as camcorders, digital cameras with video mode, audio recorders, mobile phones, handheld computing devices, and other computing devices, to generate content. Users may subsequently desire to share the content they have generated with friends, family members, or the public. Accordingly, users may upload the user-generated content to a media source.

In some implementations, the media source may be a content sharing website, such as the YOUTUBE, DAILYMOTION, VIMEO, etc. websites. In some implementations, the media source may be a social networking site, such as the FACEBOOK, MYSPACE, LINKEDIN, etc. websites. In some implementations, the media source may be a local or remote storage facility capable of hosting user-generated content. In some implementations, the media source may reside in or be part of content source 416. In some implementations, the user's content generation device may itself be capable of functioning as a media source.

The media source may require the user to provide authentication information in order to upload user-generated content to the media source. The media source may require a user to setup an account on the media source such that any user-generated content uploaded by the user to the media source is associated with the corresponding user account. Any suitable authentication mechanism, such as pass codes or two-step authentication procedures, may be utilized to permit the user to login to the user's account. In some implementations, the media source may automatically watermark any user-generated content uploaded by a user with that user's account identifier.

The media source may store uploaded user-generated content in a variety of suitable formats. The media source may compress the uploaded user-generated content using any suitable compression techniques. For example, the media source may store video using lossless MPEG encoding. In some implementations, the media source may convert the format of the uploaded user-generated content to any other format better suited to the media source and media guidance application. For example, user-generated content uploaded in AVI format may be converted to H.264 format by the media source.

The media source may request the user to associate identifiers with the user-generated content being uploaded to the media source. Identifiers may be used to distinguish the type of content, categorize the content, index the content, or generally identify the content. For example, a user may choose to associate a sports identifier with a video clip of a soccer match. In some implementations, identifiers may be searchable text, keywords, phrases, or any other suitable combination.

The media source may provide pre-defined identifiers which a user may select to associate with the user-generated content being uploaded. For example, when the user uploads user-generated content, the media source may request the user to select one or more pre-defined identifiers to associate with the user-generated content. In some implementations, the media source may provide pre-defined hierarchical identifiers to associate with user-generated content. For example, the broadest first level of identifiers may be video, audio, and text. The second level of identifiers may provide additional details classifying the video, audio, or text. For example, the second level of identifiers may be categories like sports, news, comedy, drama, adult, kids, sci-fi, fantasy, etc. Additional levels of identifiers may also be pre-defined as desired.

In some implementations, instead of hierarchical identifiers, the media source may pre-define multi-dimensional identifiers. For example, any user-generated content uploaded to the media source may be associated with a three-dimensional identifier—video-London-family—denoting that the content is a video, it was shot in London, and its content concerns the family of the user who generated the content. In some implementations, any number of dimensions may be used to identify the user-generated content. Examples of identifiers used as components of a multi-dimensional identifier may represent the type of content (e.g., video, audio, text, etc.), metadata of the content (e.g., resolution, fidelity, number of words, etc.), location where the content was generated, location depicted in the content, description of the content, theme of the content, personalities depicted in the content, or related content. Any other suitable identifier may also be used.

In some implementations, the media source may permit a user to associate user-defined identifiers with the user-generated content being uploaded. For example, when the user uploads the user-generated content, the media source may request the user to associate one or more identifiers with the user-generated content. The media source may allow the user to input any suitable combination of text, keywords, or phrases as identifiers. In some implementations, the media source may utilize any suitable combination of pre-defined identifiers or user-defined identifiers.

The media source may not complete uploading the user-generated content until the user inputs at least one pre-defined or user-defined identifier to associate with the user-generated content being uploaded. For example, the media source may prompt the user to input at least one identifier in order to complete uploading the user-generated content.

In some implementations, the media source may permit the user to complete uploading the user-generated content without requiring the user to associate any identifier with the user-generated content being uploaded. The media source may automatically determine one or more identifiers to associate with the uploaded user-generated content if the user-generated content is uploaded without the association of any identifiers.

The media source may utilize auxiliary information corresponding to the uploaded user-generated content to automatically determine relevant identifiers to associate with the uploaded user-generated content. For example, the media source may utilize audio, video, or text information contained in the uploaded user-generated content.

In some implementations, the media source may search any text and/or metadata contained in the uploaded user-generated content for pre-defined identifiers. For example, if the uploaded user-generated content is a document or a video with subtitles, the media source may perform a semantic or contextual search of the text or subtitles determine that the uploaded user-generated content is related to sports. Accordingly, the media source may then associate a Sports identifier with the uploaded user-generated content. The media source may first convert an audio track corresponding to the uploaded user-generated content to text before performing a semantic or contextual search.

The media source may alternatively and/or additionally recognize the genre of content of the user-generated content based on video and/or image recognition. For example, the media source may employ image recognition techniques to evaluate video frames of the user-generated content and determine identifiers to associate with the uploaded user-generated content. For example, the media source may recognize a baseball bat in a video frame of user-generated content and associate a Sports identifier with the uploaded user-generated content. The media source may additionally be capable of recognizing a location depicted in the user-generated content based on video and/or image recognition.

The media source may determine previous identifiers most frequently used by the user who uploaded the user-generated content and associate the determined identifiers with the uploaded user-generated content. For example, the user may have previously uploaded only user-generated content that is sports themed. Accordingly, the media source may associate a sports identifier with the most recently user-generated content uploaded by the user. The media source may provide the user an opportunity to setup one or more default identifiers to associate with user-generated content uploaded by that user. The media source may alternatively and/or additionally use any other suitable auxiliary information contained in the uploaded user-generated content or information known regarding the user who uploaded the user-generated content to determine relevant identifiers to associate with the uploaded user-generated content.

The media source may provide a social network functionality using which users may create profiles and circles of friends, family, and acquaintances with whom to share user-generated content that they upload to the media source. The media source may evaluate the interests of the social network friends of the user uploading user-generated content and associate identifiers indicating those interests to the uploaded user-generated content. The media source may prompt the user to accept or decline the suggested identifiers that the media source gleans from the user's social network friends.

In some implementations, users may upload user-generated content and restrict the audience with which the uploaded content may be shared. For example, a user may wish to share content generated by that user with his or her family but not the public at large. The media source may capture such sharing restrictions by generating license files. The media source may associate a generated license file with the corresponding uploaded content. The media source may generate the license files based on the user's social network, e.g., the media source may generate a license file permitting the uploaded user-generated content to be shared only with the user's social network friends by default.

The media guidance application may create a custom media source for display in the interactive media guide. It should be understood that in some implementations control circuitry 304 may provide the functionality of the media guidance application or control the media guidance application.

The media guidance application may generate and display an interactive media guide that allows a user to conveniently access user-generated content along with conventional content sources (e.g., broadcast or cable channels). The media guidance application may retrieve user-generated content from a media source to which users upload user-generated content. In some embodiments, the media source may push recently uploaded user-generated content to the media guidance application. In some embodiments, the media guidance application may retrieve user-generated content most recently uploaded to the media source in response to a user request to access the interactive media guide.

The media guidance application displays a custom media source adjacent to conventional content sources on the interactive media guide. For example, the media guidance application may list a custom media source on the interactive guide in manner similar to how a broadcast channel may be listed on the interactive media guide. The media guidance application may populate the custom media source with user-generated content retrieved from the media source based on user preferences. For example, user preferences may indicate the user prefers to view user-generated content that was uploaded to the media source most recently. Accordingly, the media guidance application may populate the custom media source with retrieved user-generated content that was uploaded to the media source most recently. For example, user preferences may indicate the user prefers to view user-generated content that matches the user's interests. Accordingly, the media guidance application may populate the custom media source with retrieved user-generated content from the media source that matches the user's interests.

Figure 5:
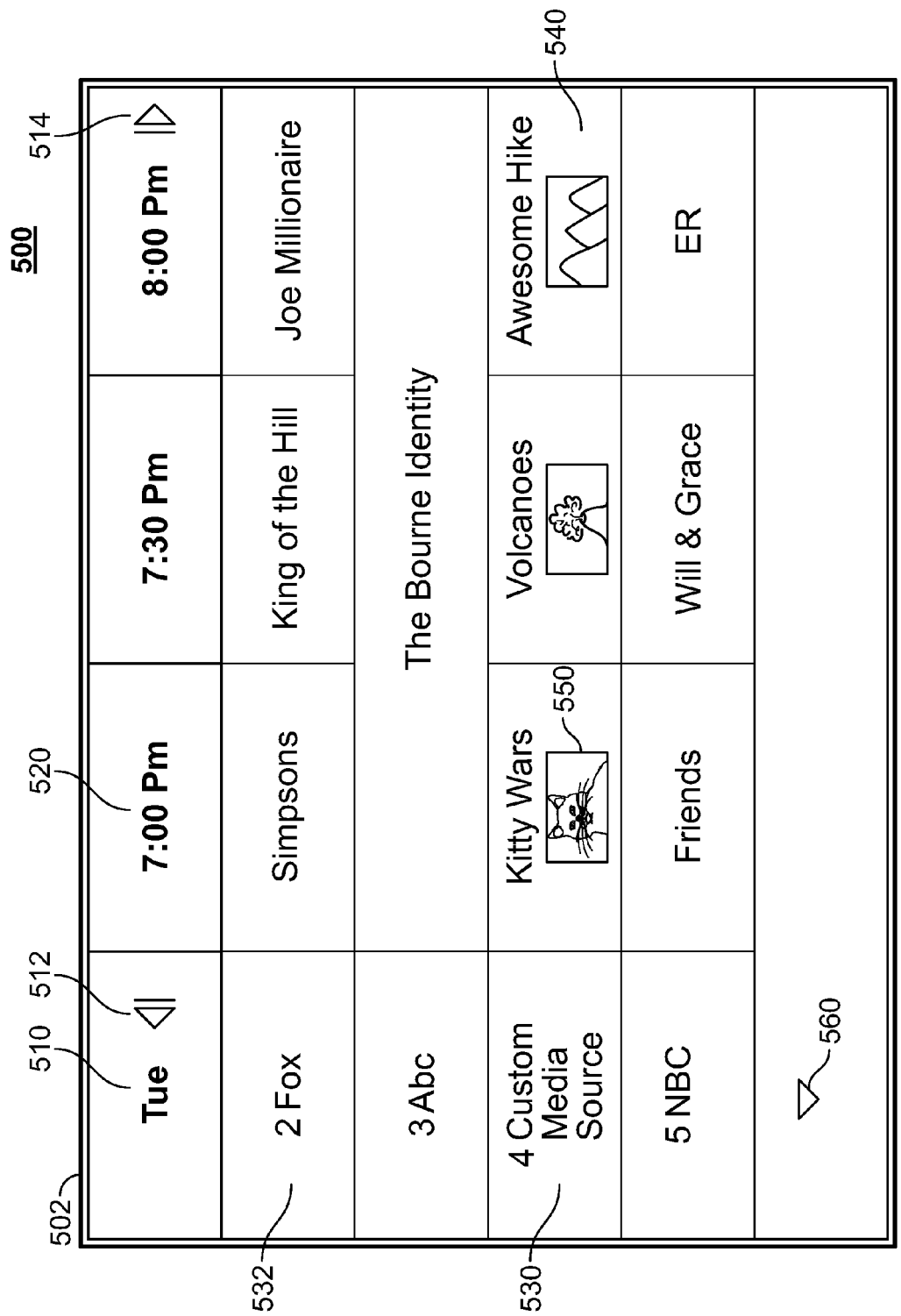
FIG. 5 shows an illustrative display screen showing an interactive media guide that includes a customized media source in accordance with an embodiment of the invention.

FIG. 5 shows an illustrative display screen showing an interactive media guide that includes a customized media source in accordance with an embodiment of the invention. The media guidance application may generate display screen 502 for display automatically or responsive to a user request.

In some implementations, display screen 502 may include date region 510, time navigation icons 512 and 514, time bar 520, content source bar 532, custom media source 530, source navigation icon 560, title region 540, and clip region 550.

Date region 510 may display the current day, date, and/or time. Time bar 520 may display time slots during which content may be available from various content sources. Title region 540 may display content from various content sources available for viewing by the user during corresponding time slots displayed by time bar 520. Time navigation icons 512 and 514 may enable a user to navigate time bar 520 backwards and forwards. Content source bar 532 may display various content sources which may be accessible by the user. For example, content source bar 532 may include content sources like broadcast channels, e.g., ABC or NBC, cable channels, e.g., ESPN, pay-per-view and/or on-demand content sources, and user-generated content sources, e.g., custom media source 530.

Content source bar 532 may display conventional content sources like broadcast and cable channels adjacent to user-generated content sources like custom media source 530. The visual representation of conventional content sources and custom media source 530 in content source bar 532 may be thematically similar. Accordingly, the user may be provided a seamless media guide experience.

Title region 540 may include representations of content titles available from content sources listed in content source bar 532. Representations of titles may include text, images, graphics, or any other suitable visual indicators. Content titles may be displayed in correspondence with appropriate time slots of time bar 520. For example, content titles of content from conventional content sources may be aligned with time slots of time bar 520 according to the availability of the content. In some implementations, content titles of user-generated content available from custom media source 530 may not be aligned with time slots of time bar 520 because the time duration of user-generated content may be variable and correspond to standard 30 minute or 60 minute time slots.

Title region 540 may additionally and/or alternatively include video representations of content available from content source bar 532. For example, content titles may be accompanied by video clip 550 representative of the content. In some implementations, video clip 550 may be automatically generated by the content source, e.g., media source, or the media guidance application.

Video clip 550 may display highlight the representative portions of corresponding content. In some implementations, video clip 550 may display the first 30 seconds of corresponding content. Time durations of any other suitable length may also be used. In some implementations, video clip 550 may start playing the video clip when the user interacts with video clips 550. For example, the user may place a mouse or cursor over video clip 550.

The media guidance application may allow a user to provide user profile information to set up a profile. For example, the media guidance application may permit the user to input the type of content the user is interested in viewing, information regarding favorite programs, channels, genres, etc., and any other information relevant to personalizing the interactive media guide for the user.

The media guidance application may learn the preferences of the user by monitoring the user's interactions with the interactive media guide. For example, the media guidance application may monitor the programs, channels, or user-generated content viewed by the user. The media guidance application may alternatively and/or additionally monitor the promotions and/or any related content viewed by the user during the course of viewing programs, channels, or user-generated content.

The media guidance application may monitor content viewed by the user using the interactive media guide. The media guidance application may determine whether any identifiers are associated with the selected content. If the media guidance application determines that identifiers are indeed associated with the content, then the media guidance application may store the determined identifiers in a database corresponding the to the user's profile. In some implementations, the media guidance application may create or update the user's profile in this manner.

The database in which identifiers associated with content selected by the user for viewing are stored may be substantially the same database in which other parameters characterizing the user's profile are stored. In some implementations, the database may be a key-value database or an SQL database. Any other suitable database technology may also be used. In some implementations, the database may be stored in storage 308. In some implementations, the database may be stored remotely on a central server or on a cloud making the user's profile available on multiple devices.

The media guidance application may determine that no identifiers are associated with the content selected for viewing by the user. Accordingly, the media guidance application may employ other modalities for creating or updating the user's profile based on the content selected for viewing by the user. Generally, the media guidance application may rely on auxiliary information contained in or associated with the content selected by the user for viewing in order to classify the content. Once the media guidance application has classified the content selected for viewing by the user, the media guidance application may create or update the user's profile based on the determined classification. For example, the media guidance application may determine that a particular content selected for viewing by the user is a football game. The media guidance application may accordingly add a sports identifier to the user's interests section of the user's profile.

The media guidance application may check whether the content selected for viewing by the user is part of a collection or a channel. For example, the user may view the show BattleStar Galactica on the Sci-Fi channel. Accordingly, the media guidance application may add a Sci-Fi identifier to the user's interests section of the user's profile. For example, the user may view user-generated content Riots in Beirut which may be part of a collection called News. Accordingly, the media guidance application may add a News identifier to the user's interests section of the user's profile.

The media guidance application may alternatively and/or additionally add identifiers related to the identifiers determined to characterize the content selected for viewing by the user. For instance, in the above example where the media guidance application determines that a News identifier characterizes user-generated content Riots in Beirut, the media guidance application may additionally add Live Events, Violence, Politics, or World to the user's interests section of the user's profile.

The media guidance application may check whether the content selected for viewing by the user has audio or text components. For example, a video may contain subtitles or new content may contain text. For example, if the user-generated content Riots in Beirut has an audio track, the media guidance application may convert the audio to text. The media guidance application may perform a semantic or contextual search of the subtitles or text contained in the content or audio converted to text of the content to determine one or more identifiers that best characterize the content. For example, after performing a semantic or contextual search on German subtitles of user-generated content Riots in Beirut, the media guidance application may determine that Documentary identifier best characterizes the content. Accordingly, media guidance application may add a Documentary identifier to the user's interests section of the user's profile.

The media guidance application may identify the user who uploaded the user-generated content selected by the user for viewing. The media guidance application may determine whether the identified user has uploaded any other user-generated content to the media source and if so, the identifier most frequently used by the user when uploading user-generated content. For example, the media guidance application may determine that user-generated content Riots in Beirut was uploaded by user Bob and the identifier most frequently used by Bob when uploading content is News. Accordingly, the media guidance application may add a News identifier to the user's interests section of the user's profile.

The media guidance application may generate custom media source 530 for display in the interactive media guide based at least in part on the user's profile. For example, the media guidance application may populate custom media source 530 with user-generated content from the media source that matches the interests of the user indicated by the user's profile. In some implementations, the media guidance application may strictly restrict the user-generated content retrieved from the media source to user-generate content associated with identifiers that match identifiers stored in the user's profile. In some implementations, the media guidance application may additionally retrieve from the media source user-generated content associated with identifiers that are related but not necessarily identical to identifiers stored in the user's profile.

Figure 6:
FIG. 6 shows an illustrative display screen showing the arrangement of user-generated content in the customized media source in accordance with an embodiment of the invention.
Figure 6:
Figure 6:
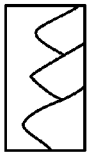
Figure 6:
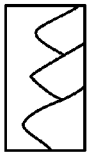

FIG. 6 shows an illustrative display screen showing the arrangement of user-generated content in the customized media source in accordance with an embodiment of the invention. The media guidance application may show display screen 602 responsive to a selection of custom media source 530 on display screen 502 as described above in connection with FIG. 5.

Display screen 602 may include content source bar 610, date region 630, title region 640, clip region 650, video clip listing 660, title listing 670, and date listing 680. Content source bar 610 may include a listing, or any other suitable representation, of content sources accessible by the user. Custom media source 620 may be visually distinguished from other content sources in content source bar 610 because the user selected custom media source 620 to access display screen 602. For example, custom media source 620 may be displayed using a different font size, color, or graphic than other content sources in source content bar 610. Any other suitable distinguishing visual indicator may be used.

Display screen 602 may include listings of user-generated content available through custom media source 620. In some implementations, listings of available user-generated content may be organized by date, title, and/or clip. For example, date listing 680 may indicate the date each user-generated content displayed on display screen 602 was added to the media source. Date listing 680 may additionally include the time each user-generated content displayed on display screen 602 was added to the media source. For example, title listing 670 may indicate the title of each user-generated content displayed on display screen 602. For example, clip listing 650 may indicate preview video clips of each user-generated content displayed on display screen 602.

User-generated content available through custom media source 620 may be sorted by date. For example, date listing 680 may display information corresponding to user-generated content retrieved by the media guidance application that was most recently added to the media source. In some implementations, user-generated content available through custom media source 620 may be sorted by title. For example, title listing 640 may display information corresponding to user-generated content available through custom media source 620 sorted alphabetically. In some implementations, user-generated content available through custom media source 620 may be sorted by clip. For example, clip listing 660 may display information corresponding to user-generated content available through custom media source 620 sorted according to the relevance of the user-generated content. For example, user-generated content that matches the user's interests most closely, as indicated in the user's profile, may be displayed towards the beginning of clip listing 660.

Figure 7:
FIG. 7 shows an illustrative display screen showing further arrangement of user-generated content in the customized media source in accordance with an embodiment of the invention.
Figure 7:
Figure 7:
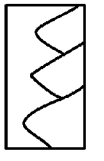
Figure 7:
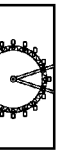

FIG. 7 shows an illustrative display screen showing further arrangement of user-generated content in the customized media source in accordance with an embodiment of the invention. The media guidance application may show display screen 702 responsive to a selection of custom media source 530 on display screen 502 as described above in connection with FIG. 5.

Display screen 702 may include custom media source 710, date region 720, title region 740, clip region 760, video clip listing 770, title listing 750, and date listing 730. In some implementations, the organization of user-generated content, available through the media source, displayed on display screen 702 may be substantially similar to the organization described above in connection with FIG. 6.

The media guidance application may establish a network connection with the media source in order to retrieve user-generated content from the media source. The media guidance application may establish a connection with the media source in response to receiving a user request to access the interactive media guide. The media guidance application may alternatively establish a connection with the media source prior to receiving a user request to access the interactive media guide. In some implementations, the network connection may be established using a handshake protocol. In some implementations, the network connection may be encrypted. In some implementations, the media guidance application may establish the network connection upon a request from the user to view custom media source 530. In some implementations, the media guidance application may establish the network connection periodically or upon startup of the interactive media guide.

In some implementations, the network connection may be established by the media source instead. For example, the media source may establish the network connection when the media source wants to push user-generated content to the media guidance application. The media source may be configured to push user-generated content to the media guidance application as soon as or a pre-determined interval of time after user-generated content associated with identifiers identical or related to identifiers stored on the user's profile is uploaded to the media source. The media guidance application may transmit information corresponding to the user's profile to the media source. Information corresponding to the user's profile may include identifiers representative of the user's interests and any other relevant information. In some implementations, the media source may be capable of retrieving the user's profile information from the storage location where the user's profile is stored.

Once the media guidance application has established a network connection with the media source, the media guidance application may search the media source for user-generated content associated with identifiers that are substantially identical to one or more identifiers stored in the user's profile. For example, the user's interest section of the user's profile may include News, Sports, and Politics identifiers. Accordingly, the media guidance application may search the media source for any user-generated content associated with News, Sports, or Politics identifiers.

In some implementations, the media source may provide the user an opportunity to select a single identifier that best captures the user's interests. The user may be able to modify this single identifier at any time. In some implementations, the media guidance application may search the media source for user-generated content associated exclusively with the single identifier, e.g., Sports, thereby creating a custom media source which is equivalent to a customized Sports channel. In this case, the user may accordingly, be able to view user-generated content associated only with the Sports identifier in custom media source 530. The media guidance application may display an icon and/or any other identifying information adjacent to custom media source 530 indicating the single identifier.

The user may indicate that the user is primarily interested in user-generated content associated with the News identifier. The media guidance application may accordingly search the media source for user-generated content associated exclusively with the News identifier, thereby creating a custom media source which is equivalent to a customized News channel. In this case, the user may accordingly, be able to view user-generated content associated only with the News identifier in custom media source 530. The media guidance application may be operable to filter user-generated content according to the language and/or location of the user-generated content. For example, the media guidance application may search the media source for user-generated content associated with the News identifier that is in English. For example, the media guidance application may search the media source for user-generated content associated with the News identifier that is related to the location France. The media guidance may filter user-generated content based on any other criteria specified by the user.

In some implementations, the user may pick the content source from which the media guidance application may retrieve content to populate custom media source 530. For example, the user may specify that custom media source 530 should be populated with content from an on-demand content source. The on-demand content source may be Internet based.

For example, custom media source 530 may be a custom news channel based on the sources from which the media guidance application retrieves content. The media guidance source may search various Internet-based content sources for news and provide the user a customized news channel. The media guidance application may filter content based on the user's search requirements like language, e.g., English-only, and/or user's interests and preferences. For example, a user in Montana may prefer more local news than a user in New York City. The media guidance application may allow the user to interact with custom media source 530. For example, the media guidance application may present news content from the United Kingdom if the user chooses to view news content from the United Kingdom. If the user chooses not to view news content from the United Kingdom, the media guidance application may present the user with an option to view other news content.

The media guidance application may retrieve the user-generated content associated with identifiers that are substantially identical to one or more identifiers stored in the user's profile from the media source. The media guidance application may store a copy of the retrieved user-generated content locally in storage 308. In some implementations, the media guidance application may stream the retrieved user-generated content from the media source when the user requests to view the retrieved user-generated content. In some implementations, the media guidance application may store the retrieved content remotely on a central server or a cloud service and may stream the content from the central server or cloud service when the user requests to view the retrieved user-generated content.

The media guidance application may evaluate any license files associated with the user-generated content associated with identifiers that are substantially identical to one or more identifiers stored in the user's profile from the media source. For example, some users may upload user-generated content and restrict the audience with which the uploaded content may be shared. Accordingly, the media guidance application may determine whether license files corresponding to the user-generated content associated with identifiers that are substantially identical to one or more identifiers stored in the user's profile permits the user to view the corresponding user-generated content. If the media guidance application determines that a license file prevents the user from viewing a particular user-generated content, then the media guidance application may elect to not retrieve that user-generated content from the media source.

The media guidance application may not find any user-generated content associated with identifiers that are identical to identifiers stored in the user's profile. Accordingly, the media guidance application may search the media source for user-generated content associated with identifiers that are related to identifiers stored in the user's profile. For example, if the media guidance application does not find any user-generated content on the media source associated with a Soccer identifier, the media guidance application may search the media source for user-generated content associated with a Sports identifier. For example, the Sports identifier may be referred to as a super-category of the Soccer identifier. For example, the Sports identifier may be a first level identifier and the Soccer identifier may be a second level identifier.

If the media guidance application does not find user-generated content associated with identifiers that are substantially identical to one or more identifiers stored in the user's profile, the media guidance application may search the media source for user-generated content associated with identifiers that are substantially identical to one or more identifiers of the super-category of the identifiers stored in the user's profile. If the media guidance application finds user-generated content associated with identifiers that are substantially identical to one or more identifiers of the super-category of the identifiers stored in the user's profile, the media guidance application may retrieve such content from the media source.

In some implementations, if the media guidance application does not find user-generated content associated with identifiers that are substantially identical to one or more identifiers stored in the user's profile, the media guidance application may perform a semantic or contextual search of identifiers associated with user-generated content in the media source looking for identifiers that are related to identifiers stored in the user's profile. For example, if the user's interests section of the user's profile contains Live events and Music identifiers, the media guidance application may perform a semantic or contextual search of the media source for U2 or The Beatles identifiers. The above example is merely illustrative and a wide variety of semantic or contextual searches may be possible.

The media guidance application may generate custom media source 530 based on the user-generated content retrieved from the media source. For example, the media guidance application may populate user-generated content in custom media source 530 in the order that the content was retrieved from the media source.

The media guidance application may populate user-generated content in custom media source 530 based on the time of day. For example, during peak times of day such as early morning or evening, the media guidance application may populate custom media source 530 with user-generated content that is skewed towards user-generated content associated with hard content identifiers. For example, hard content identifiers may include News, World, Politics, or Sports. During off-peak hours such as mid-morning to mid-afternoon, the media guidance application may populate custom media source 530 with user-generated content that is skewed towards soft human-interest related content such as user-generated content associated with Traffic, Weather, Comedy, Music, Movie, or Fiction identifiers.

The media guidance application may provide the user an opportunity to customize the user-generated content that the media guidance application populates custom media source 530 with based on the time of day. For example, time periods such as hard content, video wallpaper, soft content, and entertain-me may be pre-defined by the media guidance application. The hard content and soft content time periods may respectively correspond to peak and off-peak times of the day. The video wallpaper time period may correspond to a time period during which the user desires to view randomly selected user-generated content retrieved by the media guidance application from the media source. The entertain-me time period may correspond to a time period during which the user desires to view user-generated content associated with Comedy, Music, Movies, or Fiction identifiers. The above described time periods are merely illustrative and the user may configure any other suitable customized time periods as desired.

The media guidance application may provide the user an opportunity to customize the user-generated content that the media guidance application populates custom media source 530 with based on the time/date the user-generated content was added to the media source or based on how closely the user-generated content matches the user's interests as noted in the user's profile. For example, the user may prefer to view user-generated content in custom media source 530 sorted such that user-generated content that was added most recently to the media source is displayed first. For example, the user may prefer to view user-generated content in custom media source 530 sorted such that user-generated content that most closely matches the interests of the user is displayed first.

The media guidance application may populate custom media source 530 with promotions in addition and/or alternatively to populating custom media source 530 with user-generated content retrieved from the media source. For example, the media guidance application may insert relevant promotions between adjacent user-generated content retrieved from the media source. For example, the media guidance application may insert relevant promotions into specific user-generated content retrieved from the media source.

In some implementations, the media guidance application may select promotions automatically. The promotions may be universal or local. For example, promotions may be directed to audiences universally, e.g., a promotion may exhort audiences worldwide to purchase chocolates. The promotions may alternatively be directed to a particular segment of the audience, e.g., audiences only in France may be shown a promotion for a Ford automobile because it may only be purchased in France.

The media guidance application may automatically select a promotion based on the user's location. For example, the media guidance source may evaluate a promotion and make a determination as to whether the promotion is universal or local. If the promotion is determined to be local, the media guidance application may make a comparison of the location of the user and the audience that the promotion is directed to. The media guidance application may include the promotion in custom media source 530 if the location of the user matches the audience that the promotion is directed to. If the promotion is determined to be universal, the media guidance may include the promotion in custom media source 530 without evaluating the user's location. The media guidance application may automatically select universal, local, or a combination of universal and local promotions for inclusion in custom media source 530.

The media guidance application may retrieve promotions from content source 416. In some implementations, content source 416 may periodically transmit promotions to the media guidance application. The media guidance application may, in some instances, populate custom media source 530 entirely with promotions selected in the manner described above.

The media guidance application may additionally display identifiers for each retrieved user-generated content on a display screen of the interactive media guide. For example, display screen 602 of FIG. 6 may include a list of identifiers (not shown) associated with each user-generated content displayed on display screen 602.

Figure 8:
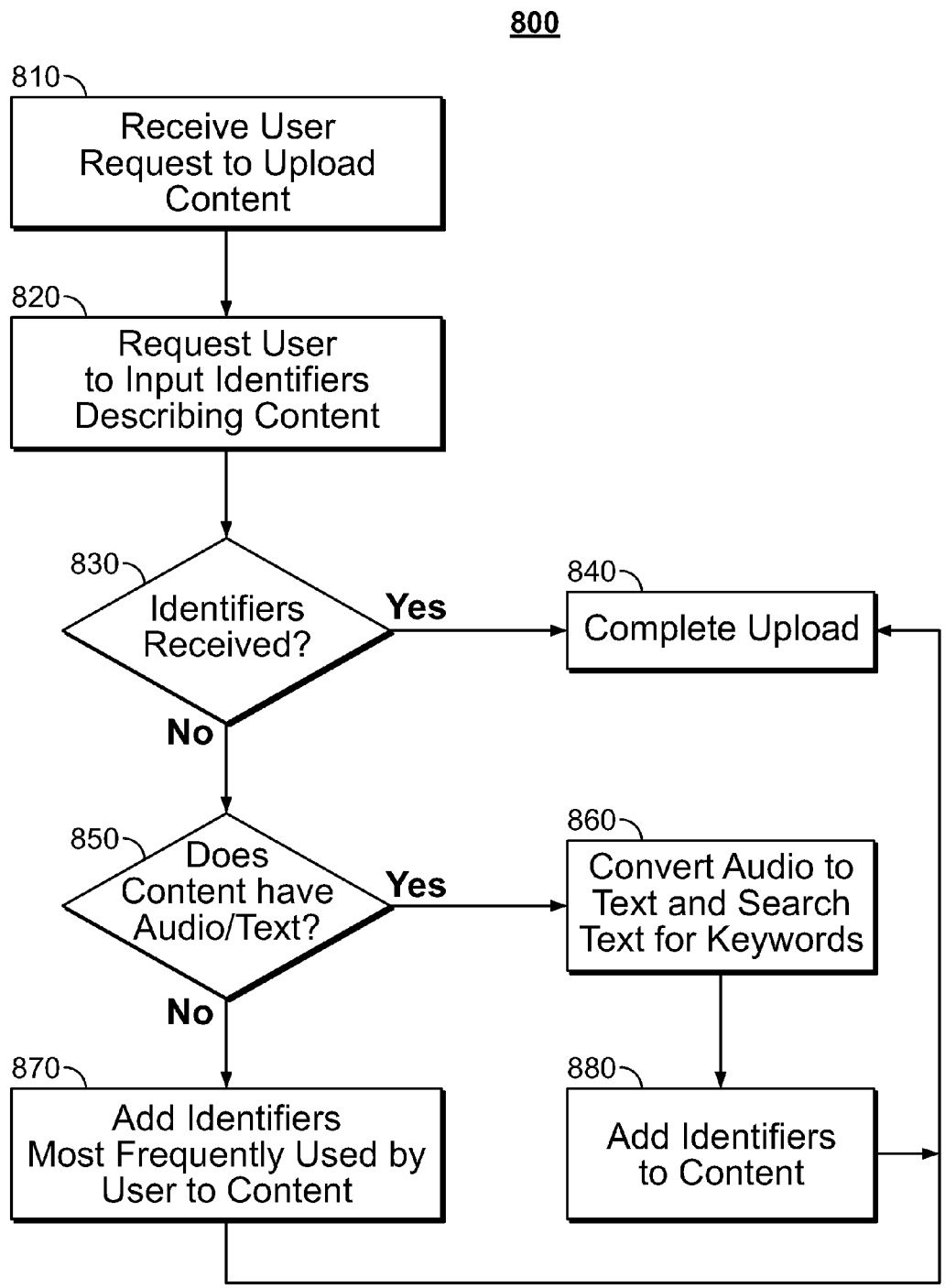
FIG. 8 shows an illustrative flow diagram for uploading media content to a media source in accordance with an embodiment of the invention.

FIG. 8 shows an illustrative flow diagram for uploading media content to a media source in accordance with an embodiment of the invention. At step 810, the media source may receive a request from a user who desires to upload user-generated content to the media source. In some implementations, the media source may request the user to provide authentication information in order to access the appropriate user account prior to allowing the user to upload the user-generated content. If the user is unable to provide correct authentication information in a pre-determined number of attempts the user may be locked out from accessing the media source. If the user provides valid authentication information then process 800 may proceed to step 820.

At step 820, the media source may request the user to provide one or more identifiers characterizing the user-generated content being uploaded to the media source. For example, the media source may present the user with a form with blank fields that the user may fill out with appropriate identifiers. For example, the media source may present the user with suggested identifiers that the user may choose from as appropriate.

At step 830, the media source may make a determination as to whether the user provided at least one identifier characterizing the user-generated content being uploaded to the media source. For example, the media source may check whether the user has selected at least one of the suggested identifiers the media source presented to the user. In response to determining that the user has not provided any identifiers, the process may proceed to step 850. Otherwise the process may proceed to step 840 where the upload of the user-generated content may be completed and the user may be prompted regarding the completion of the upload process.

At step 850, the media source may make a determination as to whether the user-generated content being uploaded to the media source contains an audio track or text component. In response to determining that the user-generated content does not have any audio track or text component, the process may proceed to step 870.

Otherwise the process may proceed to step 860. At step 860, if the user-generated content has an audio track, the media source may convert the audio track to text. The media source may then perform a semantic or contextual search on the text converted from the audio track or the text component of the user-generated content for identifiers characterizing the user-generated content. For example, the user-generated content being uploaded may be a video tour of Cornell University with sub-titles. By searching the text component of the content, i.e., sub-titles, the media source may determine that Education, Cornell University, Tour, and New York identifiers appropriately characterize the content.

At step 880, the media source may associate the identifiers determined at step 860 with the user-generated content being uploaded. For example, the media source may modify the metadata of the user-generated content being uploaded to include the determined identifiers. The process may then proceed to step 840.

At step 870, the media source may identify the user associated with the user account to which the user-generated content is being uploaded. The media source may further determine the identifiers most frequently used by the identified user for user-generated content uploaded by the identified user in the past. The media source may associate the identifiers determined to be used most frequently with the user-generated content being uploaded. For example, the media source may modify the metadata of the user-generated content being uploaded to include the determined identifiers. The process may then proceed to step 840.

Figure 9:
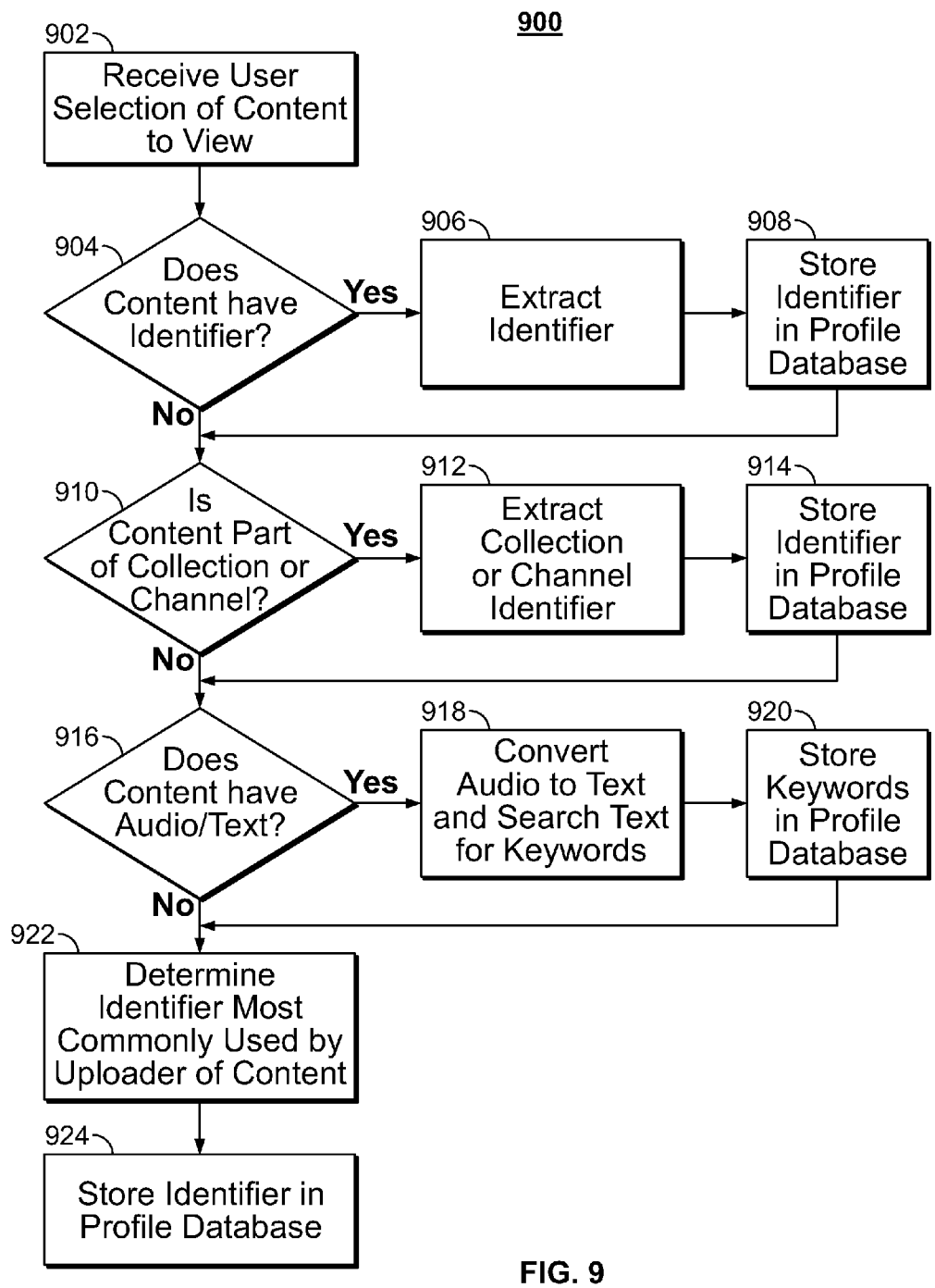
FIG. 9 shows an illustrative display flow diagram for creating a user profile in accordance with an embodiment of the invention.

FIG. 9 shows an illustrative display flow diagram for creating a user profile in accordance with an embodiment of the invention. At step 902, the media guidance application may receive a selection from a user of content that the user desires to view. For example, the user may desire to view a user-generated content from custom media source 530.

At step 904, the media guidance application may make a determination as to whether the content selected by the user is associated with any identifiers characterizing the content. For example, the media guidance application may evaluate the metadata of the content to determine if any identifiers are present. In response to determining that the content does not contain any identifiers, the process may proceed to step 910.

Otherwise, the process may proceed to step 906 where the media guidance application may extract one or more identifiers from the content. For example, the media guidance application may read an identifier from the metadata of the content and store the read identifier in storage 308. The process may then proceed to step 908 where the media guidance application may store the extracted identifier in a database corresponding to the user's interests section of the user's profile. The process may then proceed to step 910.

At step 910, the media guidance application may make a determination as to whether the content is part of any content collection or channel. For example, a movie Scream may be part of a Horror special series. For example, a football game may be telecast on the NFL Network. For example, user-generated content Sights of London may be part of a Travel series created by the uploader of that user-generated content. In response to determining that the content is not part of a content collection or channel, the process may proceed to step 916.

Otherwise, the process may proceed to step 912 where the media guidance application may generate an identifier based on the title of the content collection or channel. For example, the media guidance application may generate identifiers Horror, NFL, and Travel, respectively, in the three examples described above in connection with step 910. The process may then proceed to step 914 where the media guidance application may store the generated identifier in a database corresponding to the user's interests section of the user's profile. The process may then proceed to step 916.

At step 916, the media guidance application may make a determination as to whether the content contains an audio track or text component. In response to determining that the content does not have any audio track or text component, the process may proceed to step 922.

Otherwise the process may proceed to step 918. At step 918, if the content has an audio track, the media guidance application may convert the audio track to text. The media guidance application may then perform a semantic or contextual search on the text converted from the audio track or the text component of the content for identifiers characterizing the content. For example, the content may be a video tour of Cornell University with sub-titles. By searching the text component of the content, i.e., sub-titles, the media source may determine that Education, Cornell University, Tour, and New York identifiers appropriately characterize the content. The process may then proceed to step 920 where the media guidance application may store the determined identifier in a database corresponding to the user's interests section of the user's profile. The process may then proceed to step 922.

At step 922, the media guidance application may identify a user account associated with the content being viewed. For example, the content being viewed may be user-generated content uploaded by a user, Bob. The media guidance application may determine the identifiers most frequently used by Bob for content previously uploaded by Bob.

At step 924, the media guidance application may store the determined identifier in a database corresponding to the user's interests section of the user's profile.

Figure 10A:
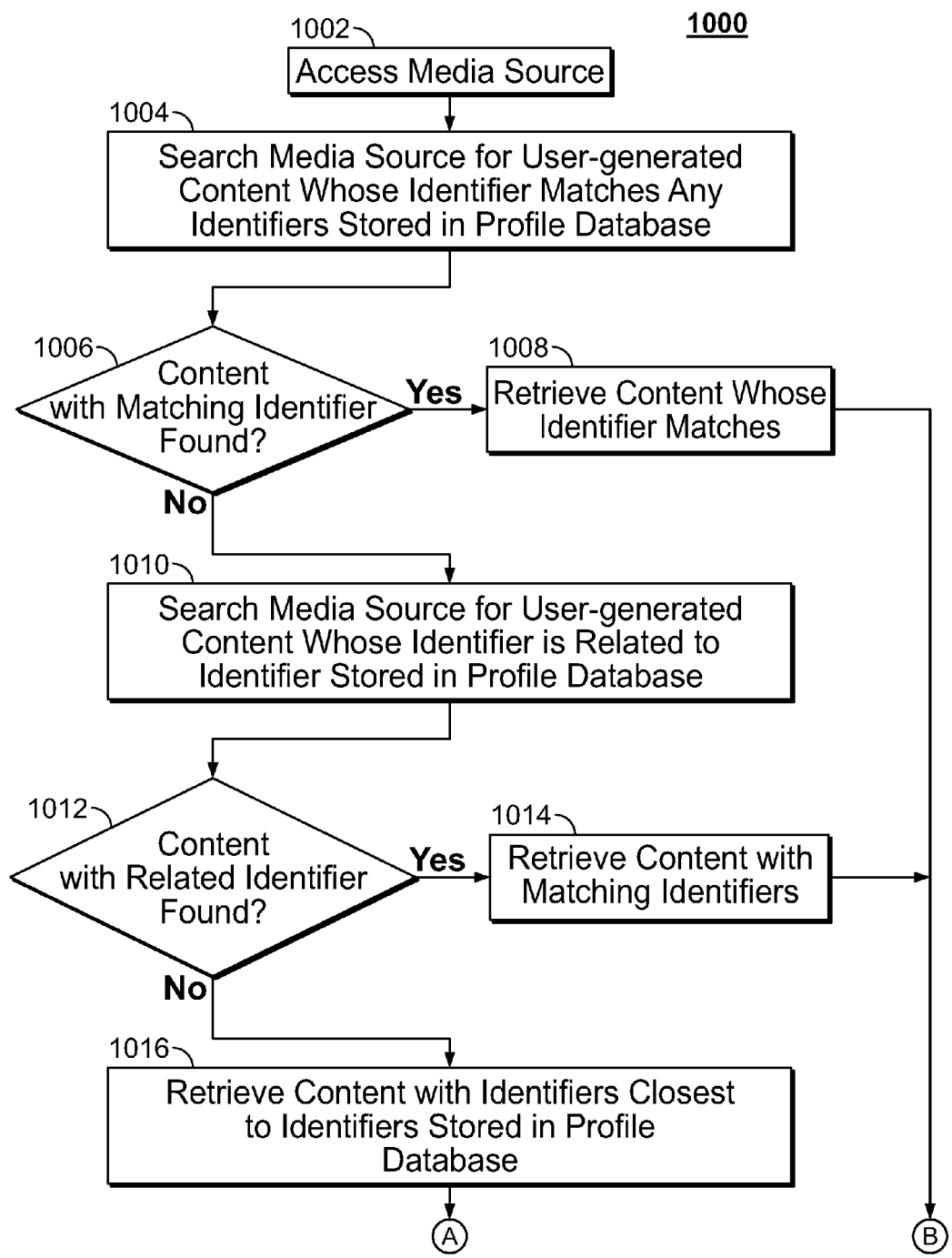
FIGS. 10A and 10B show illustrative flow diagrams for creating the customized media source based on the user's profile in accordance with an embodiment of the invention.
Figure 10B:
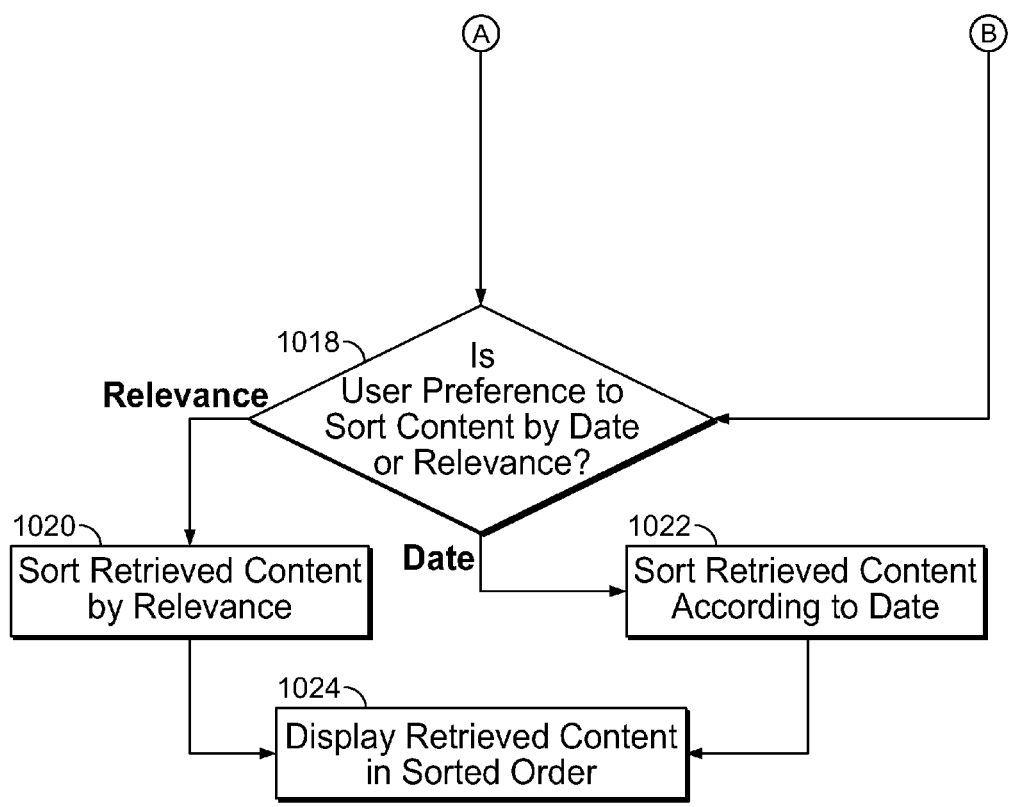

FIGS. 10(A) and 10(B) show illustrative flow diagrams for creating the customized media source based on the user's profile in accordance with an embodiment of the invention. In FIG. 10A, at step 1002, the media guidance application may access the media source. For example, the media guidance application may establish a network connection with the media source.

At step 1004, the media guidance application may search the media source for user-generated content associated with identifiers that are substantially identical to any identifiers stored in the user's profile. For example, suppose the user's interests section of the user's profile includes identifiers Soccer, Horror, and Politics. Then the media guidance application may search the media source for all user-generated content associated with identifiers Soccer, Horror, or Politics, individually or in combination.

At step 1006, the media guidance application may make a determination as to whether the search performed at step 1004 returned any positive results. In response to determining that the search did not return any positive results, i.e., the media source does not contain any user-generated content associated with identifiers that substantially match identifiers in the user's profile, the process may proceed to step 1010. Otherwise the process may proceed to step 1008 where the media guidance application may retrieve the user-generated content associated with identifiers that substantially match identifiers in the user's profile. In some implementations, before retrieving the content, the media guidance application may make a determination as to whether sharing permissions corresponding to the retrieved user-generated content allows the user to view the content. If the user does not have permission to view the content the process may proceed to step 1010. Otherwise, the process may proceed to step 1018 of FIG. 10B.

At step 1010, the media guidance application may search the media source for user-generated content associated with identifiers that are related to identifiers stored in the user's profile. For example, if the user's interests section of the user's profile includes identifiers Soccer, Horror, and Politics, the media guidance application may search the media source for all user-generated content associated with identifiers Sports, Movies, or News. The media guidance application may search the media source for user-generated content associated with the above listed identifiers individually or in any combination.

At step 1012, the media guidance application may make a determination as to whether the search performed at step 1010 returned any positive results. In response to determining that the search did not return positive results, i.e., the media source does not contain any user-generated content associated with identifiers that are related to identifiers in the user's profile, the process may proceed to step 1016. Otherwise the process may proceed to step 1014 where the media guidance application may retrieve the user-generated content associated with identifiers that are related to identifiers in the user's profile. In some implementations, the media guidance application may make a determination as to whether sharing permissions corresponding to the retrieved user-generated content allows the user to view the content. If the user does not have permission to view the content the process may proceed to step 1016. Otherwise, the process may proceed to step 1018 of FIG. 10B.

At step 1016, the media guidance application may search the media source for user-generated content associated with identifiers that are related to identifiers stored in profiles of the user's friends. For example, the social network functionality of the media source or the media guidance application may indicate that the user is friends with Bob. Accordingly, the media guidance application may search the media source for user-generated content associated with identifiers that are related to identifiers stored in Bob's user profile. The media guidance application may retrieve the user-generated content associated with identifiers that are related to identifiers in Bob's user profile. In some implementations, the media guidance application may make a determination as to whether sharing permissions corresponding to the retrieved user-generated content allows the user to view the content. If the user does not have permission to view the content the process may end. Otherwise, the process may proceed to step 1018 of FIG. 10B.

In FIG. 10B, at step 1018, the media guidance application may make a determination as to whether the user prefers to view user-generated content in custom media source 530 sorted according to time/date or relevance. For example, the user may prefer to view user-generated content in custom media source 530 such that user-generated content added most recently to the media source is displayed first. For example, the user may prefer to view user-generated content in custom media source 530 such that user-generated content most relevant to the interests of the user is displayed first. In response to determining that the user prefers to sort user-generated content in custom media source 530 according to relevance, the process may proceed to step 1020. Otherwise the process may proceed to step 1022 where the media guidance application may sort user-generated content according to which user-generated content was added most recently to the media source. The process may then proceed to step 1024.

At step 1020, the media guidance application may sort user-generated content according to which user-generated content is most relevant to the user's interests. For example, user-generated content retrieved from the media source at step 1014

At step 1024, the media guidance application may present user-generated content in custom media source 530 sorted in the manner indicated by the user's preferences.

It should be understood that the above steps of the flow diagrams of FIGS. 8, 9, and 10 may be executed or performed in any order or sequence not limited to the order and sequence shown and described in the figures. Also, some of the above steps of the flow diagrams of FIGS. 8, 9, and 10 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for generating an interactive media guide that includes user-generated content, the method comprising:
   identifying user-generated content stored on a provider of user-generated content, wherein the user-generated content is identified based on content characteristics stored in a user profile;
   generating for display in the interactive media guide, using control circuitry, representations of the identified user-generated content together with listings of linear or on-demand non-user-generated media content; and
   generating for display in the interactive media guide, using the control circuitry, source identifiers representing the sources from which the identified user-generated content and the linear or on-demand non-user generated media content are received, wherein each of the representations of the identified user-generated content and each of the listings are arranged relative to their corresponding source identifiers, and wherein each source identifier in the generated display is presented along a common axis.

2. The method of claim 1, further comprising:
   monitoring, using control circuitry, user actions to generate the user profile, wherein the user actions are selected from a group consisting of viewing user-generated content, accessing the non-user-generated media content, and selecting promotions; and
   retrieving the identified user-generated content from the provider of user-generated content over the Internet.

3. The method of claim 1, wherein non-user-generated media content, corresponding to the listings of non-user-generated media content, is received from the provider at a scheduled transmission time.

4. The method of claim 3, further comprising:
   determining a date and a time associated with each identified user-generated content that identify when the corresponding user-generated content was added to the provider; and
   arranging the representations of the identified user-generated content according to the determined dates and times.

5. The method of claim 4, wherein the arranging further comprises:
   selecting a promotion based on the user profile;
   automatically associating the selected promotion to the identified user-generated content; and
   arranging the selected promotion with the representations of identified user-generated content.

6. The method of claim 3, wherein:
   the listings of the non-user-generated media content comprise program listings,
   the listings of the non-user-generated media content are arranged in the interactive media guide display according to a scheduled transmission time of programs corresponding to the program listings, and
   the source identifier corresponding to the user-generated media content includes an identifier of the provider.

7. The method of claim 1, wherein the identified user-generated content is retrieved based on a time of day.

8. The method of claim 1, further comprising retrieving the identified user-generated content if the identified user-generated content matches a characteristic of the user profile.

9. The method of claim 1, wherein the identified user-generated content includes a news feed.

10. The method of claim 1, wherein the identified user-generated content includes a sports feed.

11. A system for generating an interactive media guide that includes user-generated content, the system comprising control circuitry configured to:
    identify user-generated content stored on a provider of user-generated content, wherein the user-generated content is identified based on content characteristics stored in a user profile;
    generate for display, in the interactive media guide, representations of the identified user-generated content together with listings of linear or on-demand non-user-generated media content; and
    generate for display, in the interactive media guide, source identifiers representing the sources from which the identified user-generated content and the linear or on-demand non-user generated media content are received, wherein each of the representations of the identified user-generated content and each of the listings are arranged relative to their corresponding source identifiers, and wherein each source identifier in the generated display is presented a common axis.

12. The system of claim 11, wherein the control circuitry is further configured to:
    monitor user actions to generate the user profile, wherein the user actions are selected from a group consisting of viewing user-generated content, accessing the non-user-generated media content, and selecting promotions; and
    retrieve the identified user-generated content from the provider of user-generated content over the Internet.

13. The system of claim 11, wherein non-user-generated media content, corresponding to the listings of non-user-generated media content, is received from the provider at a scheduled transmission time.

14. The system of claim 13, wherein the control circuitry is further configured to:
    determine a date and a time associated with each identified user-generated content that identify when the corresponding user-generated content was added to the provider; and
    arrange the representations of the identified user-generated content according to the determined dates and times.

15. The system of claim 14, wherein the control circuitry is further configured to:
    select a promotion based on the user profile;
    automatically associate the selected promotion to the identified user-generated content; and
    arrange the selected promotion with the representations of identified user-generated content.

16. The system of claim 13, wherein:
    the listings of the non-user-generated media content comprise program listings,
    the listings of the non-user-generated media content are arranged in the interactive media guide display according to a scheduled transmission time of programs corresponding to the program listings, and
    the source identifier corresponding to the user-generated media content includes an identifier of the provider.

17. The system of claim 11, wherein the identified user-generated content is retrieved based on a time of day.

18. The system of claim 11, wherein the control circuitry is further configured to retrieve the identified user-generated content if the identified user-generated content matches a characteristic of the user profile.

19. The system of claim 11, wherein the identified user-generated content includes a news feed.

20. The system of claim 11, wherein the identified user-generated content includes a sports feed.

21. A method for generating an interactive media guide that includes user-generated content, the method comprising:
- identifying user-generated content stored on a provider of user-generated content, wherein the user-generated content is identified based on content characteristics stored in a user profile;
- generating for display in the interactive media guide, using control circuitry, representations of the identified user-generated content together with listings of linear or on-demand non-user-generated media content;
- determining, using the control circuitry, a date and a time associated with each identified user-generated content that identify when the corresponding user-generated content was added to the provider;
- arranging representations of the identified user-generated content according to the determined dates and times;
- selecting a promotion based on the user profile;
- automatically associating the selected promotion to the identified user-generated content; and
- arranging the selected promotion with the representations of the user-generated content.

22. A system for generating an interactive media guide that includes user-generated content, the system comprising control circuitry configured to:
- identify user-generated content stored on a provider of user-generated content, wherein the user-generated content is identified based on content characteristics stored in a user profile;
- generate for display, in the interactive media guide, representations of the identified user-generated content together with listings of linear or on-demand non-user-generated media content;
- determine a date and a time associated with each identified user-generated content that identify when the corresponding user-generated content was added to the provider;
- arrange representations of the identified user-generated content according to the determined dates and times;
- select a promotion based on the user profile;
- automatically associate the selected promotion to the identified user-generated content; and
- arrange the selected promotion with the representations of the user-generated content.

* * * * *